US008456756B2

(12) United States Patent
Lee et al.

(10) Patent No.: US 8,456,756 B2
(45) Date of Patent: Jun. 4, 2013

(54) ZOOM LENS BARREL ASSEMBLY

(75) Inventors: Chan-ho Lee, Gimhae-si (KR);
Young-eun Kim, Suwon-si (KR);
Hyun-min Oh, Hwaseong-si (KR);
Hee-yun Chung, Suwon-si (KR);
Bong-chan Kim, Suwon-si (KR);
Jong-jun Kim, Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 16 days.

(21) Appl. No.: 13/301,923

(22) Filed: Nov. 22, 2011

(65) Prior Publication Data
US 2012/0206821 A1 Aug. 16, 2012

(30) Foreign Application Priority Data

Feb. 11, 2011 (KR) ........................ 10-2011-0012470

(51) Int. Cl.
*G02B 15/14* (2006.01)
*G03B 17/00* (2006.01)

(52) U.S. Cl.
USPC ........... 359/701; 359/694; 359/699; 359/700; 359/823; 396/73; 396/85; 396/349

(58) Field of Classification Search
USPC .................... 359/823, 826, 694–706; 396/85, 396/348–350, 379, 72–79
See application file for complete search history.

(56) References Cited

U.S. PATENT DOCUMENTS

| | | | | |
|---|---|---|---|---|
| 6,519,096 B2 * | 2/2003 | Nomura et al. | ............... | 359/700 |
| 6,963,694 B2 * | 11/2005 | Nomura | ........................... | 396/73 |
| 6,990,291 B2 * | 1/2006 | Nomura | ........................... | 396/73 |
| 7,010,224 B2 * | 3/2006 | Nomura | ........................... | 396/85 |
| 7,085,486 B2 * | 8/2006 | Nomura | ........................... | 396/72 |
| 7,106,961 B2 * | 9/2006 | Nomura | ........................... | 396/85 |
| 7,167,644 B2 * | 1/2007 | Nomura | ........................... | 396/73 |
| 7,872,810 B2 * | 1/2011 | Nomura et al. | ............... | 359/704 |
| 7,953,317 B2 * | 5/2011 | Sasaki | ............... | 396/85 |
| 8,014,660 B2 * | 9/2011 | Nomura | ........................... | 396/72 |
| 8,059,953 B2 * | 11/2011 | Nomura | ........................... | 396/63 |
| 2009/0035495 A1 | 2/2009 | Iyoda et al. | | |

FOREIGN PATENT DOCUMENTS

EP 1 630 579 A1 3/2006

OTHER PUBLICATIONS

Search Report established for GB 1200269.7 (May 8, 2012).

* cited by examiner

*Primary Examiner* — Loha Ben
(74) *Attorney, Agent, or Firm* — Drinker Biddle & Reath LLP (57) ABSTRACT

A zoom lens barrel assembly includes: a zoom ring having a cylindrical shape, and comprising an inlet portion formed in a boundary of one end thereof and a first protrusion; a guide ring disposed around the zoom ring, and comprising a first guide hole through which the first protrusion passes, and movably supporting the zoom ring in an axial direction, and a second guide hole; and a cylinder disposed in the zoom ring, for moving and rotating between a position where the cylinder is accommodated in the zoom ring and a position where the cylinder moves away from the zoom ring in the axial direction, and comprising a second protrusion that passes through the second guide hole, accommodated in the inlet portion at the position where the cylinder is accommodated, and pressing one end of the inlet portion when the cylinder moves away from the zoom ring.

10 Claims, 5 Drawing Sheets

ZOOM LENS BARREL ASSEMBLY

CROSS-REFERENCE TO RELATED PATENT APPLICATION

This application claims the priority benefit of Korean Patent Application No. 10-2011-0012470, filed on Feb. 11, 2011, in the Korean Intellectual Property Office, the disclosure of which is incorporated herein in its entirety by reference.

BACKGROUND

1. Field

Embodiments relate to a zoom lens barrel assembly, and more particularly, to a zoom lens barrel assembly that implements a high magnification zooming function while having a small thickness when the zoom lens barrel assembly is accommodated in a camera.

2. Description of the Related Art

An optical system having various focal distances is realized when a zoom lens barrel assembly that is able to adjust distances between lens groups is mounted in a camera. The zoom lens barrel assembly can be used to change the optical system of the camera into a wide angle lens system or a telephoto lens system so that a user can perform photographing at various viewing angles without moving.

Relative positions of barrels that support lens groups must typically be changed to adjust distances between the lens groups. For example, five magnification zooming may be implemented by using a three-step zoom lens barrel assembly having three relatively movable barrels. However, such implementation increases the number of parts in the zoom lens barrel assembly.

When no photographing is performed, elements of a zoom lens barrel assembly are typically accommodated in a camera. In this regard, a thickness of the zoom lens barrel assembly must be minimized in order to realize a compact camera having a small thickness to meet market demand.

Recently, a compact camera is required to implement, for example, a high performance five magnification zooming function, and thus a zoom lens barrel assembly in the camera must perform a high performance zooming function while having a small thickness. However, lens groups of the zoom lens barrel assembly move within a previously determined stroke range, and thus a space for installing a guide groove or a hole having a predetermined length is necessary for elements of the zoom lens barrel assembly. Thus, reduction of a minimum thickness of the zoom lens barrel assembly is limited.

SUMMARY

Embodiments include a zoom lens barrel assembly that implements a high magnification zooming function while having a small thickness when the zoom lens barrel assembly is accommodated.

Embodiments also include a zoom lens barrel assembly having a reduced number of parts.

Embodiments also include a zoom lens barrel assembly that implements a high magnification zooming function while having a small thickness and a reduced number of relatively moving barrels.

According to an embodiment, a zoom lens barrel assembly includes: a first zoom ring having a cylindrical shape, and comprising an inlet portion formed in a boundary of one end thereof and a first protrusion protruding to the outside; a guide ring disposed around the first zoom ring, and comprising a first guide hole extending in an axial direction, through which the first protrusion passes, thereby movably supporting the first zoom ring in the axial direction, and a second guide hole extending in a circumferential direction; and a first cylinder disposed in the first zoom ring, the first cylinder moving and rotating between a position where the first cylinder is accommodated in the first zoom ring and a position where the first cylinder moves away from the first zoom ring in the axial direction, the first cylinder comprising a second protrusion protruding to the outside and passing through the second guide hole, the second protrusion accommodated in the inlet portion at the position where the first cylinder is accommodated in the first zoom ring, and the second protrusion pressing one end of the inlet portion when the first cylinder moves from the position where the first cylinder is accommodated in the first zoom ring to the position where the first cylinder moves away from the first zoom ring in the axial direction.

The zoom lens barrel assembly may further include: an inclination portion inclined in one end of the inlet portion in the circumferential direction of the first zoom ring.

The inclination portion may include a curve portion curved at a portion contacting the second protrusion.

The zoom lens barrel assembly may further include: a second cylinder comprising a first groove portion curved in the circumferential direction, through which the first protrusion passing through the first guide hole is inserted, and a second groove portion extending in the axial direction, through which the second protrusion passing through the second guide hole is inserted, and rotatably disposed around the guide ring.

The second cylinder may include a third protrusion protruding to the outside, and the zoom lens barrel assembly may further include: an external barrel comprising a third groove portion into which the third protrusion is inserted, and disposed around the second cylinder to rotatably support the second cylinder.

The second cylinder may include a gear disposed around the second cylinder and extending in the circumferential direction, and the zoom lens barrel assembly may further include: a driving portion coupled to the gear and that generates a driving force used to rotate the second cylinder.

The first groove portion may include an entry portion externally opened in a boundary of one end of the second cylinder and extending in the circumferential direction, and an inclination portion inclined from an end portion of the entry portion to a boundary of another end of the second cylinder and extending in the circumferential direction.

The second guide hole may include a sustaining portion extending in the circumferential direction along a boundary of one end of the guide ring and sustaining a position of the first cylinder in the axial direction with respect to the guide ring, and a changing portion inclined from an end portion of the sustaining portion to a boundary of another end of the guide ring and changing the position of the first cylinder in the axial direction with respect to the guide ring.

The zoom lens barrel assembly may further include: a second zoom ring comprising a fourth protrusion protruding to the outside and movably disposed in the first cylinder to move in the axial direction, wherein the first cylinder comprises a second zoom ring guide groove into which the fourth protrusion is inserted.

The second zoom ring may include a cutting portion extending in the axial direction in the outside thereof, and the zoom lens barrel assembly may further include: a guide portion disposed between the second zoom ring and the first cylinder, the guide portion coupled to the cutting portion, and the guide portion guiding a motion of the second zoom ring in the axial direction.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, embodiments will be described more fully with reference to the accompanying drawings, in which exemplary embodiments of the invention are shown.

Figure 1:
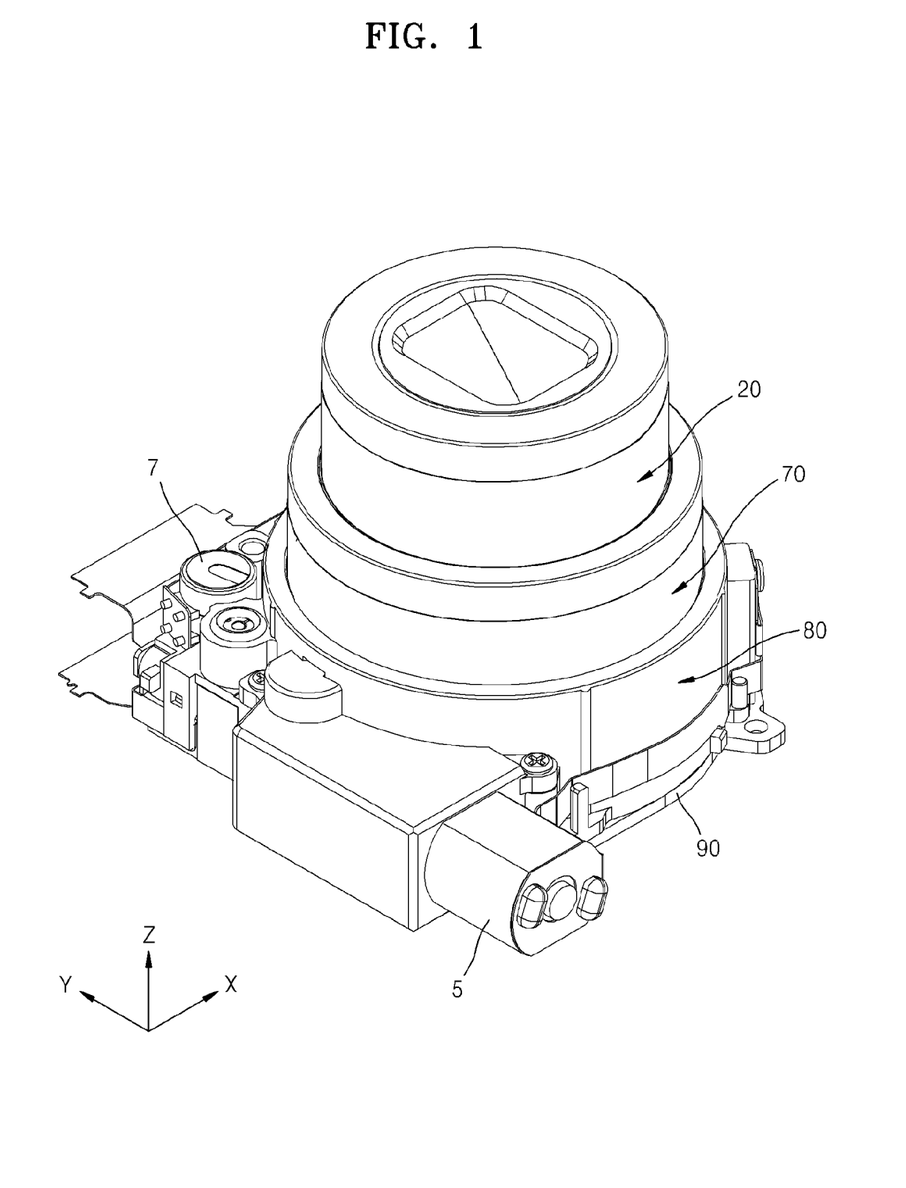
FIG. 1 is a perspective view of a zoom lens barrel assembly, according to an embodiment.

FIG. 1 is a perspective view of a zoom lens barrel assembly, according to an embodiment. Referring to FIG. 1, the zoom lens barrel assembly unfolds in two steps and performs a five-magnification optical zooming function.

The zoom lens barrel assembly includes an external cylinder 80 installed in a base 90, a first zoom ring 20 movably disposed in the external cylinder 80, and a second cylinder 70. The second cylinder 70 is disposed to move forward or backward from the external cylinder 80 in an axial direction (in a Z direction). The first zoom ring 20 is disposed to move forward or backward from the second cylinder 70 in the axial direction.

The zoom lens barrel assembly can perform a zooming function since the first zoom ring 20 and the second cylinder 70, which move from the external cylinder 80 fixed in the base 90 in the axial direction, are unfolded in two steps. Thus, a whole thickness of the zoom lens barrel assembly can be reduced when the first zoom ring 20 and the second cylinder 70 are accommodated in the external cylinder 80, thereby easily designing a small-sized and thin-shaped camera.

A driving unit 5 that generates a driving force for performing the zooming function and a focus driving unit 7 that generates a driving force for performing a focusing function are disposed in exterior surfaces of the base 90 and the external cylinder 80.

Figure 2:
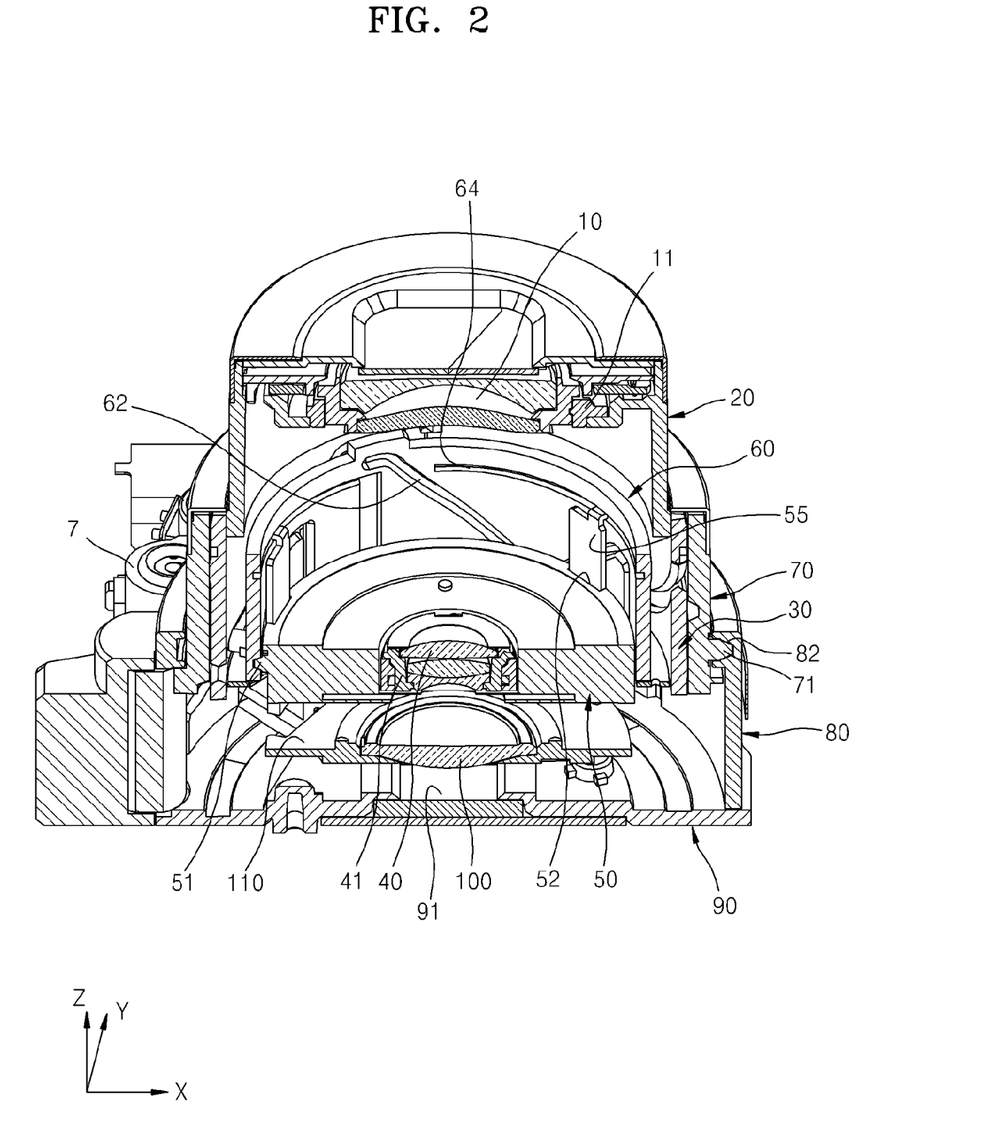
FIG. 2 is a cross-sectional perspective view of the zoom lens barrel assembly of FIG. 1, according to an embodiment.
Figure 3:
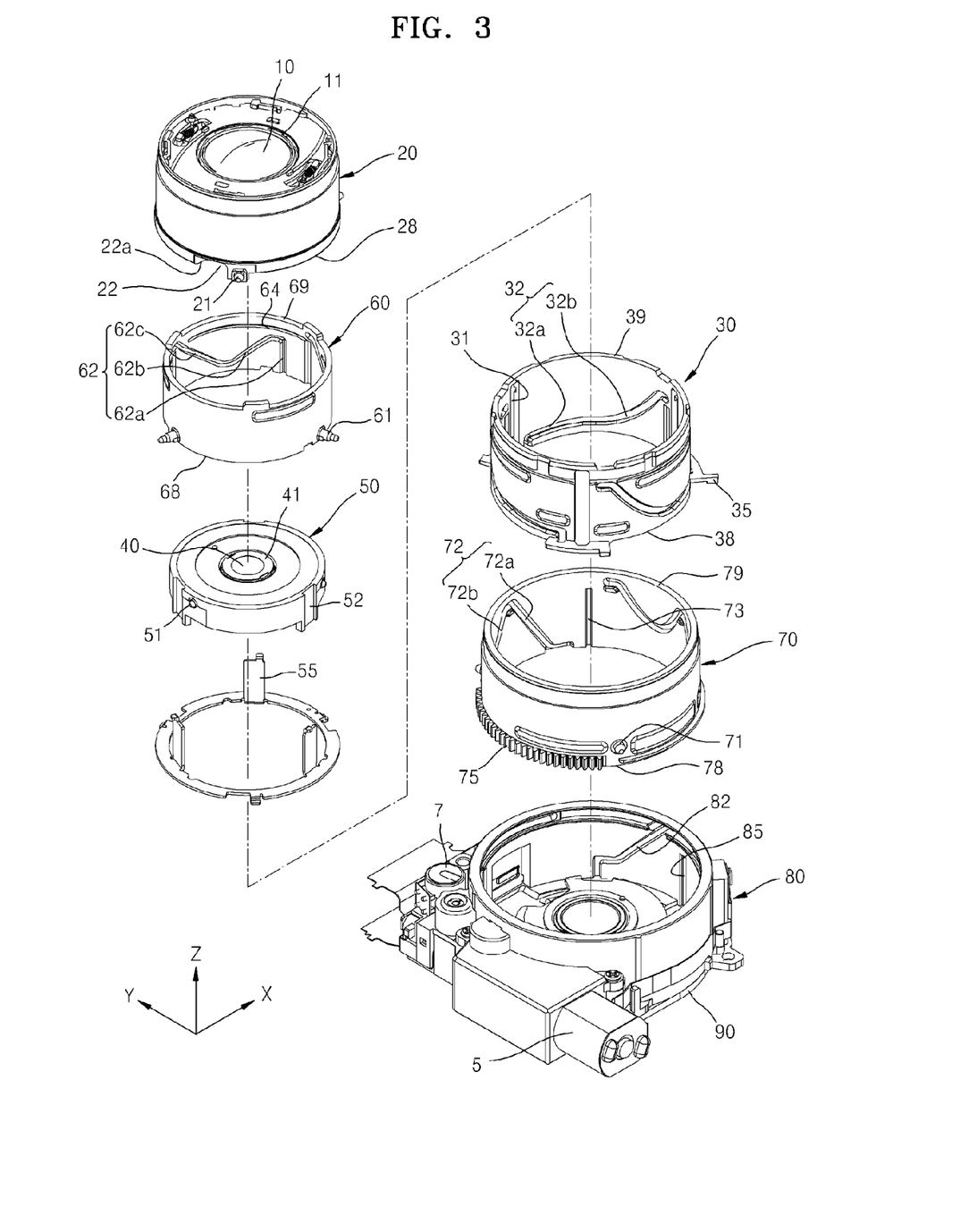
FIG. 3 is an exploded perspective view of the zoom lens barrel assembly of FIG. 1, according to an embodiment.

FIG. 2 is a cross-sectional perspective view of the zoom lens barrel assembly of FIG. 1, according to an embodiment. FIG. 3 is an exploded perspective view of the zoom lens barrel assembly of FIG. 1, according to an embodiment.

Referring to FIGS. 2 and 3, the zoom lens barrel assembly comprises the first zoom ring 20, a guide ring 30 disposed around the first zoom ring 20, and a first cylinder 60 disposed in the first zoom ring 20.

The first zoom ring 20 has a cylindrical shape, and comprises a first protrusion 21 that protrudes to the outside, and an inlet portion 22 that is inclined in a boundary 28 of one end thereof in a circumferential direction.

When the zoom lens barrel assembly operates and performs the zooming function, the first zoom ring 20 protrudes forward in the axial direction (in the Z direction) with respect to the second cylinder 70. The first zoom ring 20 performs a function of supporting a first lens group 10. The first lens group 10 is coupled to a front of the first zoom ring 20 by using a lens support portion 11 disposed therebetween. The first zoom ring 20 moves forward or backward in the axial direction, and thus a position of the first lens group 10 with respect to the axial direction can be adjusted.

The guide ring 30 has a hollow cylindrical shape and is disposed outside the first zoom ring 20. An inner wall surface of the guide ring 30 comprises a first guide hole 31 that rectilinearly extends in the axial direction, through which the first protrusion 21 of the first zoom ring 20 passes, and a second guide hole 32 that is inclined in the axial direction and extends in the circumferential direction. The first guide hole 31 guides a movement of the first protrusion 21 to allow the first zoom ring 20 to perform a rectilinear motion in the axial direction.

The first cylinder 60 is disposed in the first zoom ring 20. The first cylinder 60 has a hollow cylindrical shape, comprises a second protrusion 61 that protrudes to the outside, and moves in the axial direction while rotating. The second protrusion 61 of the first cylinder 60 is inserted into the second guide hole 32 of the guide ring 30 so that the guide ring 30 can movably support the first cylinder 60.

An exterior diameter of the first cylinder 60 is smaller than an interior diameter of the first zoom ring 20. Thus, when the first zoom ring 20 and the first cylinder 60 are guided by the guide ring 30 and move in the axial direction, the first cylinder 60 can rotate and move between a position where the first cylinder 60 is inserted into the first zoom ring 20 and a position where the first cylinder 60 moves from the first zoom ring 20 in the axial direction.

When the first cylinder 60 is at the position where the first cylinder 60 is inserted into the first zoom ring 20, the second protrusion 61 of the first cylinder 60 is accommodated in the inlet portion 22 of the first zoom ring 20. When the first cylinder 60 starts moving from the position where the first cylinder 60 is inserted into the first zoom ring 20 to the position where the first cylinder 60 moves from the first zoom ring 20 in the axial direction, the second protrusion 61 presses one side end of the inlet portion 22.

The second cylinder 70 is rotatably disposed around the guide ring 30. The second cylinder 70 has a hollow cylindrical shape and comprises a third protrusion 71 that protrudes to the outside. An inner wall surface of the second cylinder 70 comprises a first groove portion 72 into which the first protrusion 21 passing through the first guide hole 31 of the guide ring 30 is inserted, and a second groove portion 73 into which the second protrusion 61 passing through the second guide hole 32 of the guide ring 30 is inserted. Thus, the second cylinder 70 movably supports the first zoom ring 20 and the first cylinder 60 and guides a movement of the first zoom ring 20 and the first cylinder 60.

Figure 4:
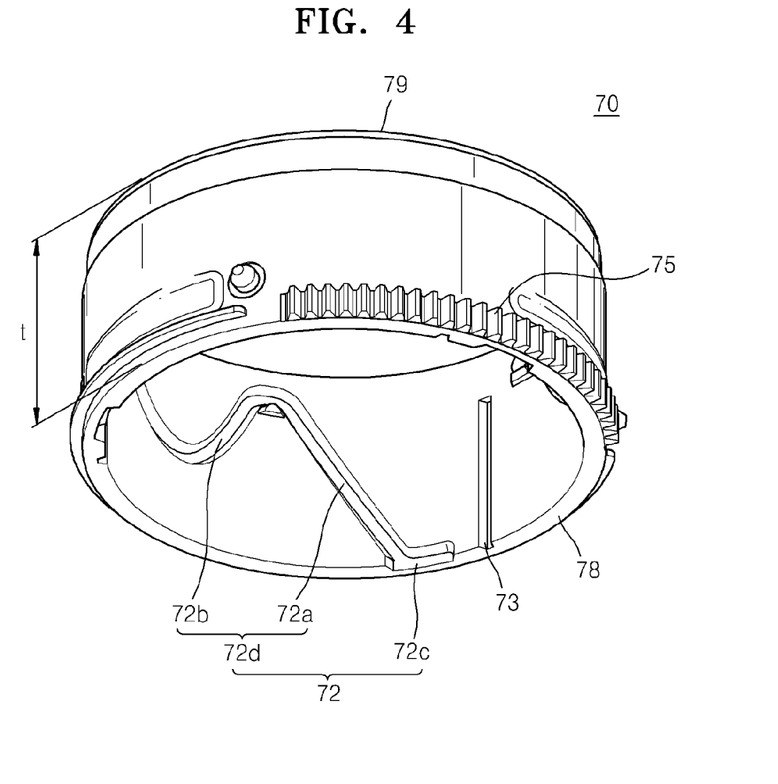
FIG. 4 is a perspective view of a second cylinder of the zoom lens barrel assembly of FIG. 3, according to an embodiment.
Figure 5:
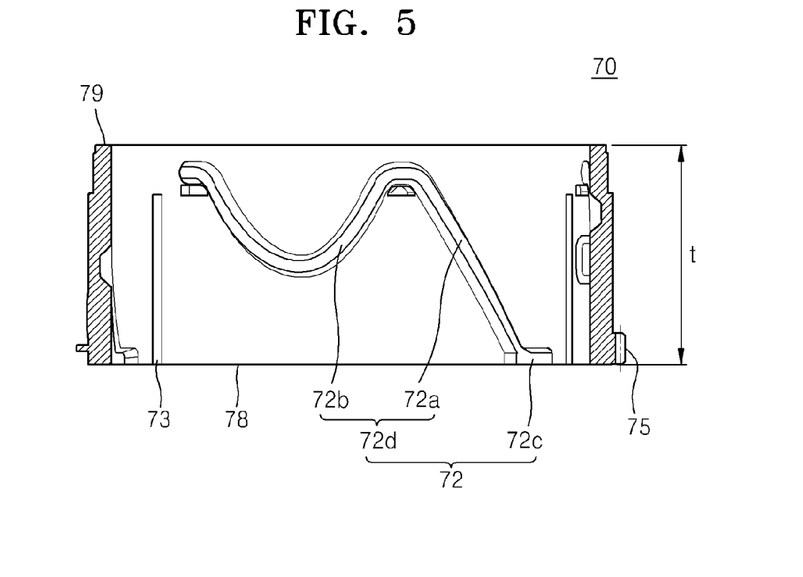
FIG. 5 is a cross-sectional view of an inner wall of the second cylinder of FIG. 4, according to an embodiment.

FIG. 4 is a perspective view of the second cylinder 70 of the zoom lens barrel assembly of FIG. 3, according to an embodiment. FIG. 5 is a cross-sectional view of the inner wall of the second cylinder 70 of FIG. 4, according to an embodiment.

Referring to FIG. 4, the first groove portion 72 comprises an entry portion 72c that is opened to the outside in a boundary 78 of one side of the second cylinder 70 and extends in a circumferential direction, and an inclination portion 72d that is inclined toward a boundary 79 of another end of the second cylinder 70 and extends in the circumferential direction.

A part of the entry portion 72c is opened to the outside in order to minimize a height t of the second cylinder 70. In a technical field related to zoom lens barrel assemblies, a groove portion that guides a movement of a zoom lens in an axial direction and is installed in a barrel generally extends from a boundary of the barrel to a space inside the barrel by a predetermined distance. However, in this case, it is difficult to minimize a height of the barrel.

In the present embodiment, the entry portion 72c corresponding to a point where the first groove portion 72 starts is externally exposed in the boundary 78 of one end of the second cylinder 70, thereby reducing the height t of the second cylinder 70 compared to a groove portion that extends from a boundary of a barrel to a space inside the barrel by a predetermined distance, and accordingly reducing a whole thickness of the zoom lens barrel assembly.

The inclination portion 72d comprises a first inclination portion 72a that is inclined from the boundary 78 of one end of the second cylinder 70 to the boundary 79 of another end thereof and extends in the circumferential direction, and a second inclination portion 72b that is inclined from an end portion of the first inclination portion 72a to the boundary 78 and extends in the circumferential direction.

The first inclination portion 72a performs a function of moving the first zoom ring 20 forward in the axial direction with respect to the second cylinder 70. The second inclination portion 72b performs a function of moving the first zoom ring 20 backward in the axial direction with respect to the second cylinder 70.

Referring to FIGS. 2 and 3, the external cylinder 80 rotatably supports the second cylinder 70 and is disposed around the second cylinder 70. The external cylinder 80 acts as a support structure that maintains a fixed state in the zoom lens barrel assembly.

A third groove portion 82 is formed in an inner wall surface of the external cylinder 80. The second cylinder 70 is disposed in the external cylinder 80, and the third protrusion 71 of the second cylinder 70 is inserted into the third groove portion 82, so that the external cylinder 80 rotatably supports the second cylinder 70. Rotation of the second cylinder 70 allows the second cylinder 70 to be guided by the third groove portion 82 of the external cylinder 80 and move in the axial direction.

A gear 75 that extends in the circumferential direction is installed in an exterior wall surface of the second cylinder 70. The driving portion 5 of FIG. 1 is connected to the gear 75, and thus a driving force generated by the driving portion 5 is transferred to the gear 75, and the second cylinder 70 rotates with respect to the external cylinder 80.

A rectilinear guide protrusion 35 that protrudes to the outside from the guide ring 30 is inserted into a rectilinear groove portion 85 that rectilinearly extends in the inner wall surface of the external cylinder 80 in the axial direction. Thus, although the guide ring 30 is disposed in the second cylinder 70, the guide ring 30 does not rotate with respect to the external cylinder 80 and rectilinearly moves in the axial direction, together with the second cylinder 70, when the second cylinder 70 rotates with respect to the external cylinder 80.

A second zoom ring 50 is movably disposed in the first cylinder 60. The second zoom ring 50 supports a second lens group 40. The second lens group 40 is coupled to the second zoom ring 50 by using a lens support portion 41 disposed therebetween.

The second zoom ring 50 comprises a fourth protrusion 51 that protrudes to the outside. The fourth protrusion 51 of the second zoom ring 50 is inserted into a second zoom ring guide groove 62 formed in an inner wall surface of the first cylinder 60, and thus the rotation of the first cylinder 60 allows the fourth protrusion 51 to be guided by the second zoom ring guide groove 62, and the second zoom ring 50 to rectilinearly move in the axial direction.

A cutting portion 52 that extends in the axial direction is formed in an exterior wall surface of the second zoom ring 50 in order to facilitate the second zoom ring 50 not to rotate and to rectilinearly move in the axial direction. A guide portion 55 that is coupled to the cutting portion 52 and guides a motion of the second zoom ring 50 in the axial direction is disposed between the second zoom ring 50 and the first cylinder 60. The guide portion 55 is inserted into a guide portion guide groove 64 that extends in the inner wall surface of the first cylinder 60 in the circumferential direction, and thus the first cylinder 60 rotates while the guide portion 55 guides the cutting portion 52. The guide portion 55 is coupled to the cutting portion 52, thereby fixing a position of the second zoom ring 50 in the circumferential direction.

As described above, since the rotation of the first cylinder 60 allows the second zoom ring 50 to move in the first cylinder 60 in the axial direction, which changes a relative position of the second lens group 40 in the axial direction with respect to the first lens group 10, the zooming function is realized.

Although the cutting portion 52 and the guide portion 55 are used to guide the second zoom ring 50 to rectilinearly move in the axial direction without rotating during the rotation of the first cylinder 60 in the present embodiment, this should not be construed as limiting. For example, a pin extending in the axial direction and a guide hole extending in the second zoom ring 50 in the axial direction, through which the pin is inserted, may be used to guide the second zoom ring 50 to rectilinearly move in the axial direction during the rotation of the first cylinder 60.

The base 90 is coupled to an end portion of the external cylinder 80. An optical device 91 that converts image light transmitted through the first lens group 10 and the second lens group 40 into an electrical signal is disposed in the base 90. The optical device 91 is disposed at a position corresponding to the first lens group 10 and the second lens group 40.

A third lens group 100 is disposed between the optical device 91 and the second lens group 40. The third lens group 100 can move in the axial direction so as to realize a focusing function.

The third lens group 100 is supported by a third zoom ring 110. The focus driving unit 7 is coupled to the third zoom ring 110. The third zoom ring 110 can move in the axial direction by a driving force generated by the focus driving unit 7, and thus a position of the third lens group 100 in the axial direction can be adjusted.

The second guide hole 32 comprises a sustaining portion 32a that extends in the circumferential direction along a boundary 38 of one end of the guide ring 30, and a changing portion 32b that is inclined from an end portion of the sustaining portion 32a to a boundary 39 of another end of the guide ring 30 and extends in the circumferential direction.

The sustaining portion 32a performs a function of sustaining a position of the first cylinder 60 in the axial direction with respect to the guide ring 30 during an initial predetermined section in which the second cylinder 70 starts rotating. The changing portion 32b performs a function of changing the position of the first cylinder 60 in the axial direction with respect to the guide ring 30.

The second zoom ring guide groove 62 formed in the inner wall surface of the first cylinder 60 comprises a rectilinear portion 62a that rectilinearly extends in the axial direction from a boundary 68 of one end of the first cylinder 60 to a boundary 69 of another end thereof, a backward inclination portion 62b that is inclined from an end portion of the rectilinear portion 62a to the boundary 68 of one end of the first cylinder 60 and extends in the circumferential direction, and a forward inclination portion 62c that is inclined from the backward inclination portion 62b to the boundary 69 of another end of the first cylinder 60 and extends in the circumferential direction.

The rectilinear portion 62a performs a function of moving the second zoom ring 50 forward in the axial direction with respect to the first cylinder 60. The backward inclination portion 62b performs a function of moving the second zoom ring 50 backward in the axial direction with respect to the first cylinder 60. The forward inclination portion 62c performs a function of moving the second zoom ring 50 forward in the axial direction with respect to the first cylinder 60.

Figure 6:
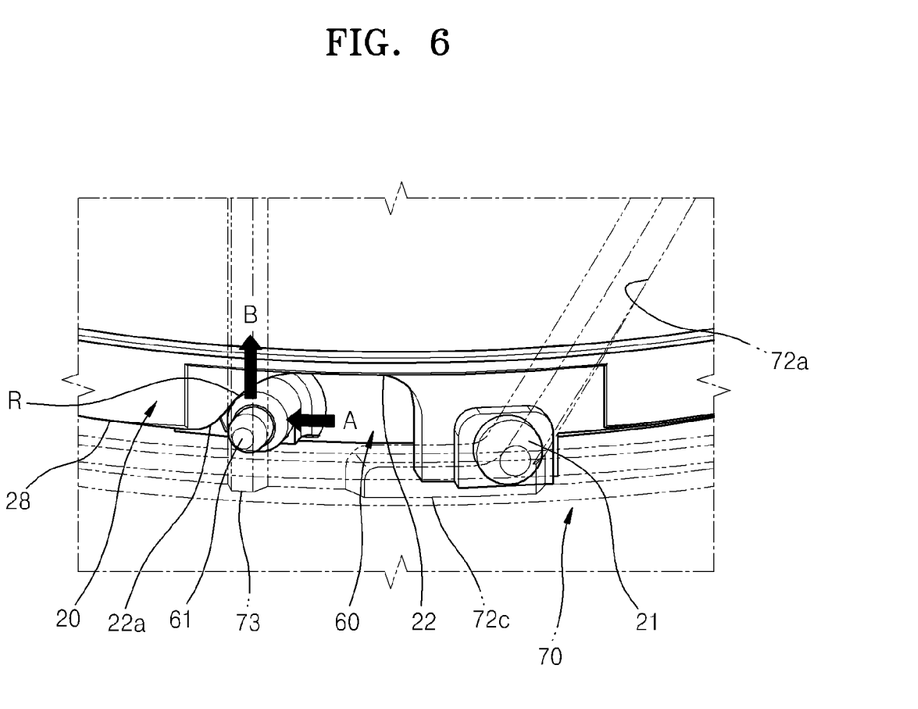
FIG. 6 is a perspective view for explaining operations of a first zoom ring and a first cylinder of the zoom lens barrel assembly of FIG. 1, according to an embodiment.

FIG. 6 is a perspective view for explaining operations of the first zoom ring 20 and the first cylinder 60 of the zoom lens barrel assembly of FIG. 1, according to an embodiment.

Referring to FIG. 6, the first cylinder 60 of the zoom lens barrel assembly accommodated in the first zoom ring 20 starts rotating in a direction of an arrow A by a force supplied from the outside. The elements of the zoom lens barrel assembly including the guide ring 30 are not shown in FIG. 6 for the purpose of promoting an understanding of the drawings.

When the first cylinder 60 is accommodated in the first zoom ring 20, the second protrusion 61 of the first cylinder 60 is accommodated in the inlet portion 22 formed in the boundary 28 of one end of the first zoom ring 20.

As described above, the second protrusion 61 of the first cylinder 60 passes through the second guide hole 32 of the guide ring 30 and is inserted into the third groove portion 82 of the external cylinder 80. Thus, rotation of the external cylinder 80 allows a rotational force of the external cylinder 80 to be transferred to the first cylinder 60 through the second protrusion 61, and thus the first cylinder 60 rotates.

The first protrusion 21 of the first zoom ring 20 is inserted into the entry portion 72c of the first groove portion 72 of the second cylinder 70 simultaneously with the rotation of the first cylinder 60 and thus the first protrusion 21 must move to the first groove portion 72. However, as described above, the entry portion 72c of the first groove portion 72 is externally exposed in the boundary 78 of one end of the second cylinder 70 and thus the first protrusion 21 is not surrounded by the entry portion 72c, and thus a motion of the first protrusion 21 is not completely restricted by the first groove portion 72 at an initial point where the first cylinder 60 starts rotating.

The second protrusion 61 of the first cylinder 60 is inserted into the second groove portion 73 of the second cylinder 70, and is guided by the second guide hole 32 of the guide ring 30, which generates a rising movement in a direction of an arrow B, and thus the second protrusion 61 presses against a inclination portion 22a formed in one end portion of the inlet portion 22. The inclination portion 22a is inclined in the circumferential direction of the first zoom ring 20, and comprises a curve portion R at a portion contacting the second protrusion 61.

According to the structure stated above, a force of the first cylinder 60 is transferred in the direction of the arrow B through the second protrusion 61, and thus the first protrusion 61 can easily move from the entry portion 72c to the first inclination portion 72a.

According to the embodiments, a zoom lens barrel assembly has a minimized whole thickness since a second protrusion of a first cylinder is accommodated in an inlet portion of a first zoom ring when the first zoom ring is accommodated in the first cylinder.

When a second cylinder is disposed outside a guide ring to rotate the first cylinder and the first zoom ring, a part of a first groove portion that guides a movement of the first protrusion of the first zoom ring is opened from a boundary of the cylinder to the outside, thereby minimizing the thickness of the zoom lens barrel assembly when accommodated. When the part of the first groove is opened to the outside, a second protrusion of the first cylinder transfers a force by pressing one side end of the inlet portion, thereby allowing a smooth motion of the first zoom ring.

Five-magnification optical zooming can be implemented by using a two-step zoom lens barrel assembly that unfolds a first zoom ring and a second cylinder in two steps, and thus the two-step zoom lens barrel assembly has a reduced number of parts.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A zoom lens barrel assembly comprising:
   a first zoom ring having a cylindrical shape, and comprising an inlet portion formed in a boundary of one end thereof and a first protrusion protruding to the outside;
   a guide ring disposed around the first zoom ring, and comprising a first guide hole extending in an axial direction, through which the first protrusion passes, thereby movably supporting the first zoom ring in the axial direction, and a second guide hole extending in a circumferential direction; and
   a first cylinder disposed in the first zoom ring, the first cylinder moving and rotating between a position where the first cylinder is accommodated in the first zoom ring and a position where the first cylinder moves away from the first zoom ring in the axial direction, the first cylinder comprising a second protrusion protruding to the outside and passing through the second guide hole, the second protrusion accommodated in the inlet portion at the position where the first cylinder is accommodated in the first zoom ring, and the second protrusion pressing one end of the inlet portion when the first cylinder moves from the position where the first cylinder is accommodated in the first zoom ring to the position where the first cylinder moves away from the first zoom ring in the axial direction.

2. The zoom lens barrel assembly of claim 1, further comprising: an inclination portion inclined in one end of the inlet portion in the circumferential direction of the first zoom ring.

3. The zoom lens barrel assembly of claim 2, wherein the inclination portion comprises a curve portion curved at a portion contacting the second protrusion.

4. The zoom lens barrel assembly of claim 1, further comprising: a second cylinder comprising a first groove portion curved in the circumferential direction, through which the first protrusion passing through the first guide hole is inserted, and a second groove portion extending in the axial direction, through which the second protrusion passing through the second guide hole is inserted, and rotatably disposed around the guide ring.

5. The zoom lens barrel assembly of claim 4, wherein the second cylinder comprises a third protrusion protruding to the outside,
   the zoom lens barrel further comprising: an external barrel comprising a third groove portion into which the third protrusion is inserted, and disposed around the second cylinder to rotatably support the second cylinder.

6. The zoom lens barrel assembly of claim 5, wherein the second cylinder comprises a gear disposed around the second cylinder and extending in the circumferential direction,
   the zoom lens barrel assembly further comprising: a driving portion coupled to the gear and that generates a driving force used to rotate the second cylinder.

7. The zoom lens barrel assembly of claim 4, wherein the first groove portion comprises an entry portion externally opened in a boundary of one end of the second cylinder and extending in the circumferential direction, and an inclination portion inclined from an end portion of the entry portion to a boundary of another end of the second cylinder and extending in the circumferential direction.

8. The zoom lens barrel assembly of claim 1, wherein the second guide hole comprises a sustaining portion extending in the circumferential direction along a boundary of one end of the guide ring and sustaining a position of the first cylinder in the axial direction with respect to the guide ring, and a changing portion inclined from an end portion of the sustaining portion to a boundary of another end of the guide ring and changing the position of the first cylinder in the axial direction with respect to the guide ring.

9. The zoom lens barrel assembly of claim 1, further comprising: a second zoom ring comprising a fourth protrusion protruding to the outside and movably disposed in the first cylinder to move in the axial direction,
   wherein the first cylinder comprises a second zoom ring guide groove into which the fourth protrusion is inserted.

10. The zoom lens barrel assembly of claim 9, wherein the second zoom ring comprises a cutting portion extending in the axial direction in the outside thereof,
    the zoom lens barrel assembly further comprising: a guide portion disposed between the second zoom ring and the first cylinder, the guide portion coupled to the cutting portion, and the guide portion guiding a motion of the second zoom ring in the axial direction.

* * * * *